US007299502B2

(12) United States Patent
Schmeling et al.

(10) Patent No.: US 7,299,502 B2
(45) Date of Patent: Nov. 20, 2007

(54) SYSTEM AND METHOD FOR PROVIDING CUSTOMIZED SECURE ACCESS TO SHARED DOCUMENTS

(75) Inventors: Garth F. Schmeling, Boise, ID (US); Darrel D. Cherry, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 883 days.

(21) Appl. No.: 09/784,116

(22) Filed: Feb. 14, 2001

(65) Prior Publication Data

US 2002/0112164 A1    Aug. 15, 2002

(51) Int. Cl.
  G06F 7/04      (2006.01)
  G06F 17/30     (2006.01)
  G06F 15/16     (2006.01)
  G06K 9/00      (2006.01)
  H03M 1/68      (2006.01)
  H04K 1/00      (2006.01)
  H04L 9/00      (2006.01)

(52) U.S. Cl. ............................ 726/29; 726/28; 726/30; 726/4; 726/5; 713/165; 713/166; 713/193; 713/194; 709/246

(58) Field of Classification Search ........ 380/277–285, 380/4.23, 30, 259; 382/115–123; 709/217–219; 713/200–202, 194, 165

See application file for complete search history.

(56) References Cited

U.S. PATENT DOCUMENTS

| | | | | |
|---|---|---|---|---|
| 6,091,835 A | * | 7/2000 | Smithies et al. | 382/115 |
| 6,098,056 A | * | 8/2000 | Rusnak et al. | 705/75 |
| 6,105,027 A | * | 8/2000 | Schneider et al. | 707/9 |
| 6,253,193 B1 | * | 6/2001 | Ginter et al. | 705/57 |
| 6,449,640 B1 | * | 9/2002 | Haverstock et al. | 709/219 |
| 6,529,910 B1 | * | 3/2003 | Fleskes | 707/10 |
| 6,859,533 B1 | * | 2/2005 | Wang et al. | 380/28 |
| 6,937,726 B1 | * | 8/2005 | Wang | 380/30 |
| 2001/0042124 A1 | * | 11/2001 | Barron | 709/227 |
| 2001/0055396 A1 | * | 12/2001 | Jevans | 380/282 |

* cited by examiner

Primary Examiner—Ayaz Sheikh
Assistant Examiner—Longbit Chai

(57) ABSTRACT

A document management system and method. The inventive system includes a server for providing data from a stored document. Software is provided on the server for encrypting the data. A communications subsystem is included for transporting the encrypted data from the server to the client. Software is provided at the client for decrypting the encrypted data. The inventive method includes the steps of: using a client machine to access a server via a network and to request data therefrom; encrypting at least a portion of said data on said server; communicating said encrypted data from said server to said client; and decrypting said data on said client. In the illustrative embodiment, the inventive method operates under the control of an agent residing on the server. The encrypting software is a first applet residing on the server and the decrypting software is a second applet residing on the client. In the illustrative implementation, the second applet is communicated from the server to the client. Several mechanisms are included for verifying the user's identity including a digital signature, a private key and a public key. In accordance with the invention, software is included for customizing the data based on the user's access rights; providing for secure modification of the shared document; and tracking submission, access, and changes in the document.

19 Claims, 5 Drawing Sheets

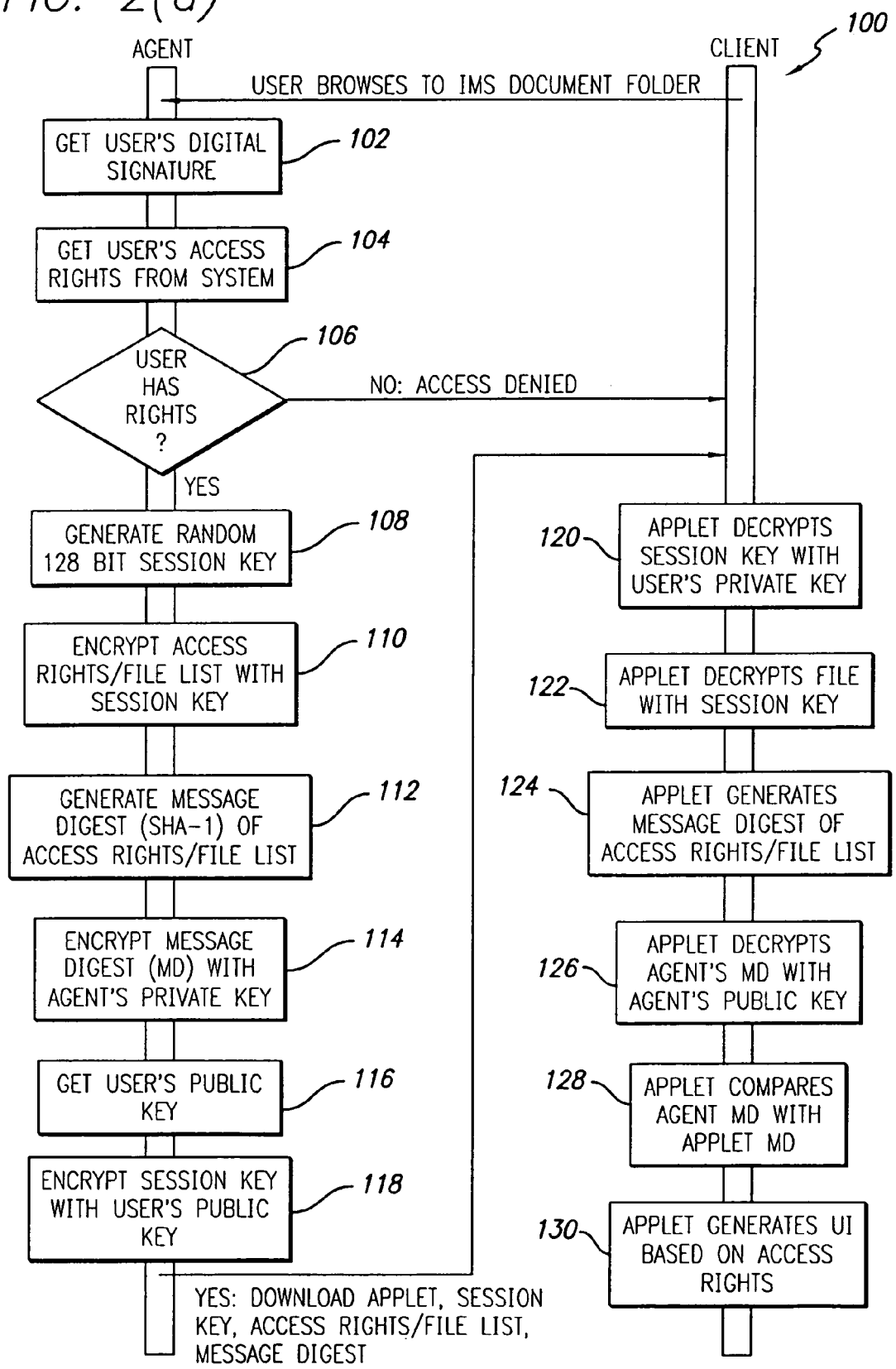

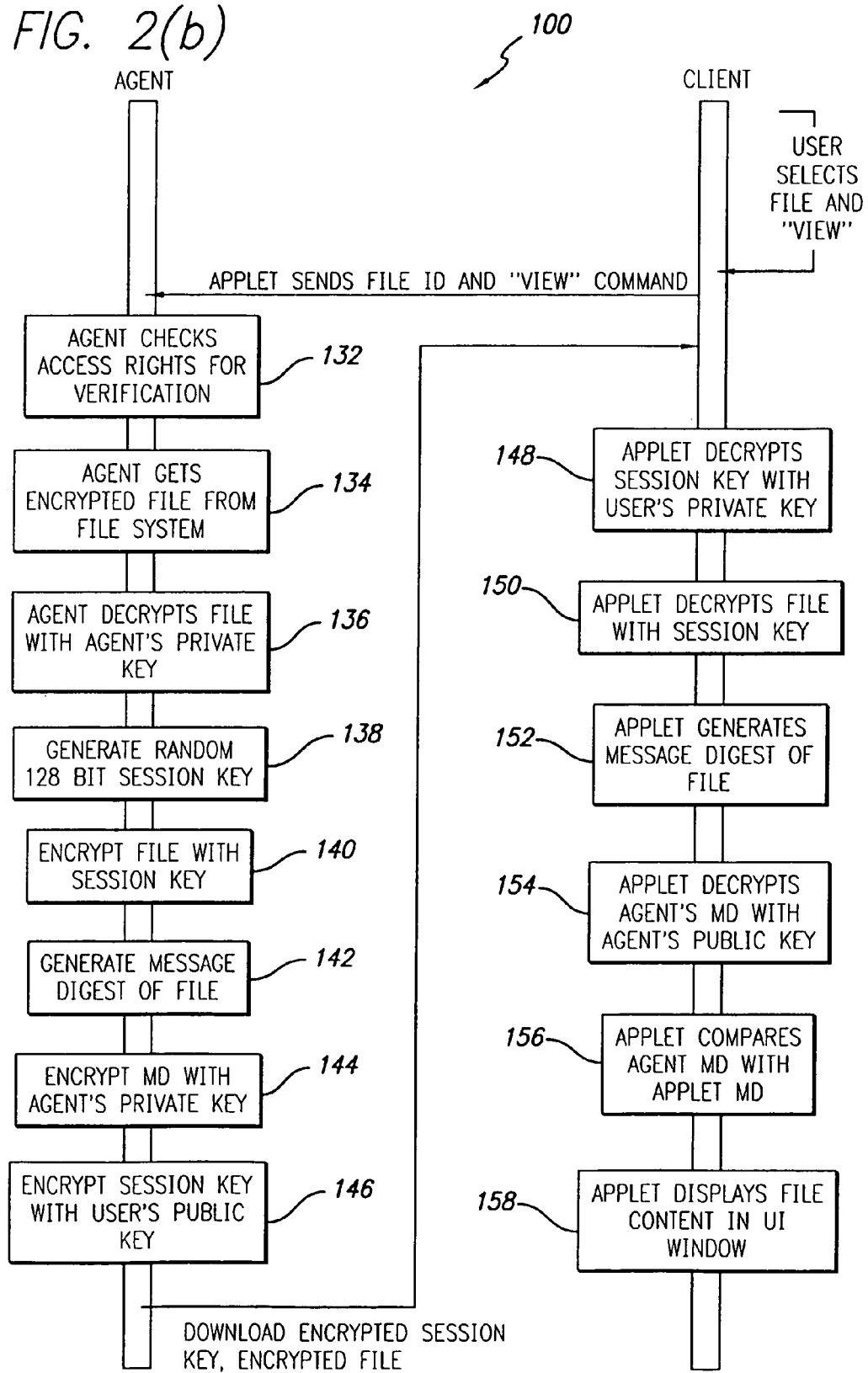

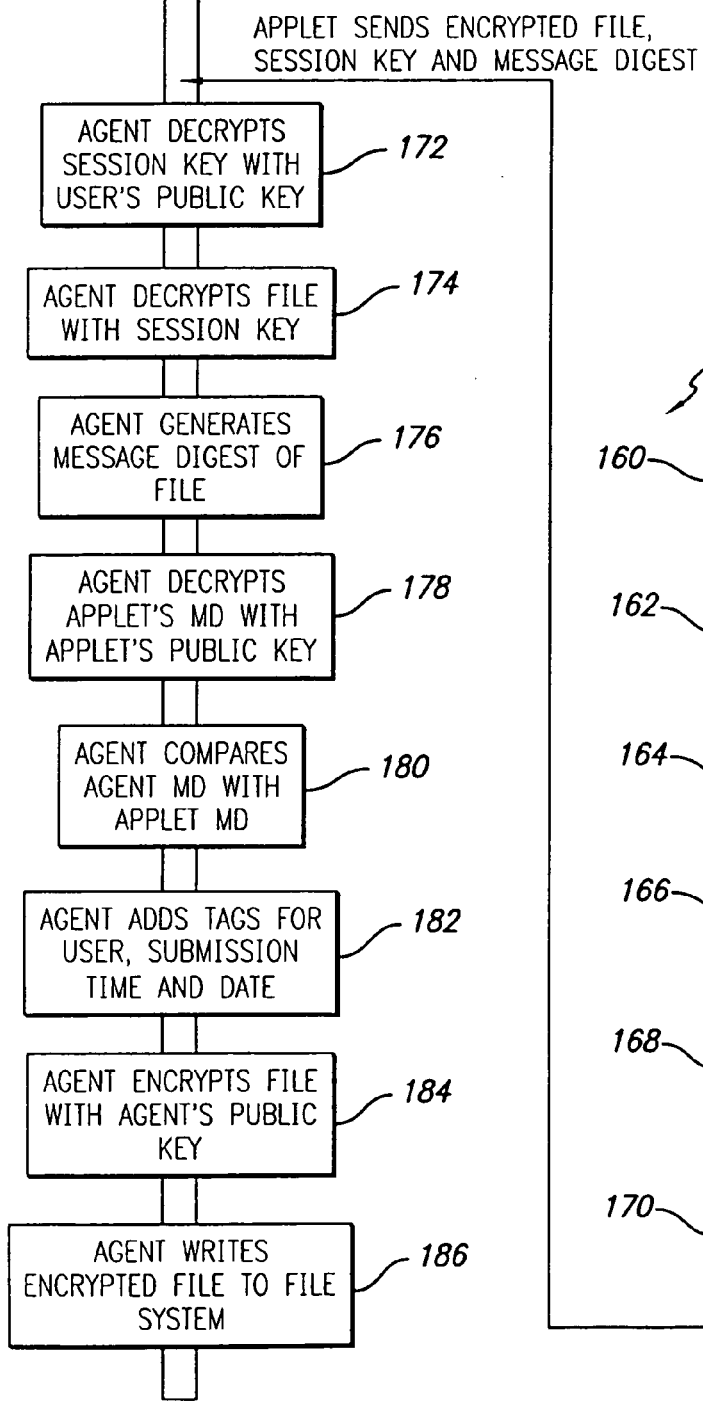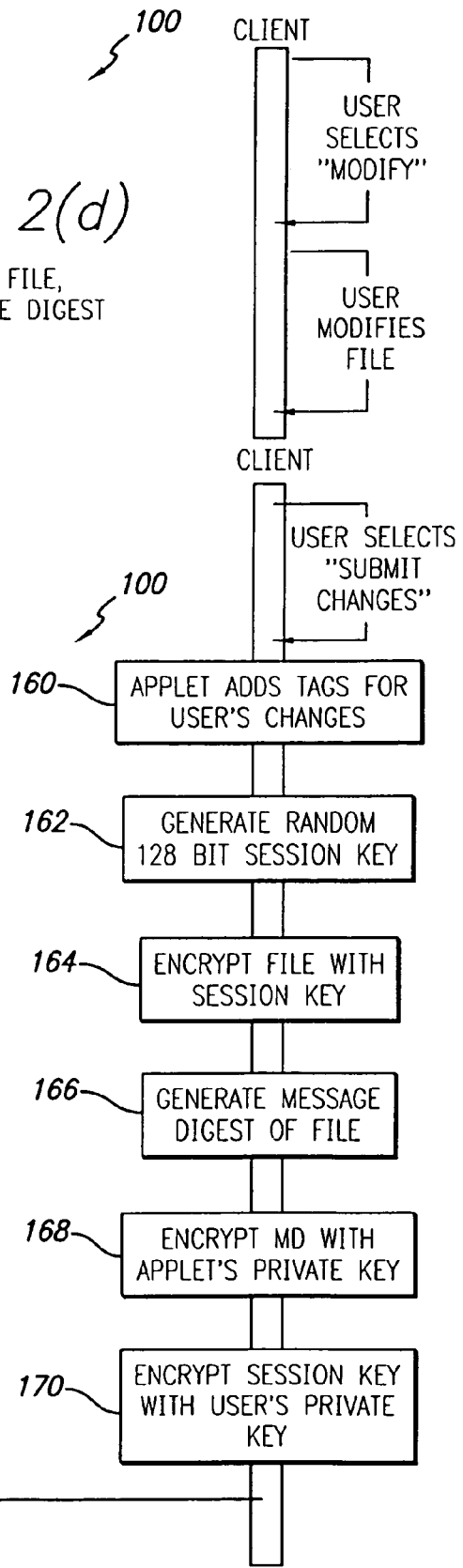

SYSTEM AND METHOD FOR PROVIDING CUSTOMIZED SECURE ACCESS TO SHARED DOCUMENTS

BACKGROUND OF THE INVENTION

1. Field of the Invention

The present invention relates to computing systems and networks therefor. More specifically, the present invention relates to document management systems implemented over a computing network.

2. Description of the Related Art

The availability of the Internet or World Wide Web, wide area networks and local area networks have enabled fast, convenient electronic document sharing. One technique for sharing documents involves the use of email attachments. However, this approach requires an identification of recipients and may be limited, by some network administrators with respect to file size.

Accordingly, an alternative approach involving the use of a web site to share documents is often preferred. This approach involves a posting of documents available for download on the site. A user, equipped with a browser, running on a computer accesses the site and selects the documents to be downloaded. While this approach is more effective with respect to the transfer of larger documents, access control is limited in that those that have access to the site generally have access to all of the documents listed as being available on same. Hence, there is a need for a more flexible yet secure system for providing access control to shared documents. There is an associated need to be able to verify the identity of the user.

In addition, for many applications, there is a need for a capability of customizing the information to be shared based on the recipient's clearance level, i.e., presentation security. For example, in a case where a new software product is to be released, it would be useful to be able to provide only user interface and command data for nontechnical readers charged with the responsibility of preparing a user manual and technical data for technically trained readers.

There is a further need for providing for secure transmission from a secure site such that eavesdroppers may not be able to gain unauthorized access to the document while in transmission.

Finally, there is a need for a system or method for maintaining an audit trail of submission, accesses and modifications to a document.

While document management systems are known, generally, conventional systems do not provide adequate security, present detail or control, secure transmission, information on the work flow process and the ability to track simultaneous changes on shared documents. Hence, a need remains for a system or method for providing these features in a document management system.

SUMMARY OF THE INVENTION

The need in the art is addressed by the document management system and method of the present invention. The inventive system includes a server for providing data from a stored document. Software is provided on the server for encrypting the data. A communications subsystem is included for transporting the encrypted data from the server to the client. Software is provided at the client for decrypting the encrypted data.

The inventive method includes the steps of: using a client machine to access a server via a network and to request data therefrom; encrypting at least a portion of said data on said server; communicating said encrypted data from said server to said client; and decrypting said data on said client.

In the illustrative embodiment, the inventive method operates under the control of an agent residing on the server. The encrypting software is a first applet residing on the server and the decrypting software is a second applet residing on the client. In the illustrative implementation, the second applet is communicated from the server to the client. Several mechanisms are included for verifying the user's identity including a digital signature, a private key and a public key.

In accordance with the invention, software is included for customizing the data based on the user's access rights; providing for secure modification of the shared document; and tracking submission, access, and changes in the document.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention provides a system and method for viewing documents in a manner that is both secure, customized to the individual viewing or modifying the document, and maintains an audit-trail of changes to the document.

Figure 1:
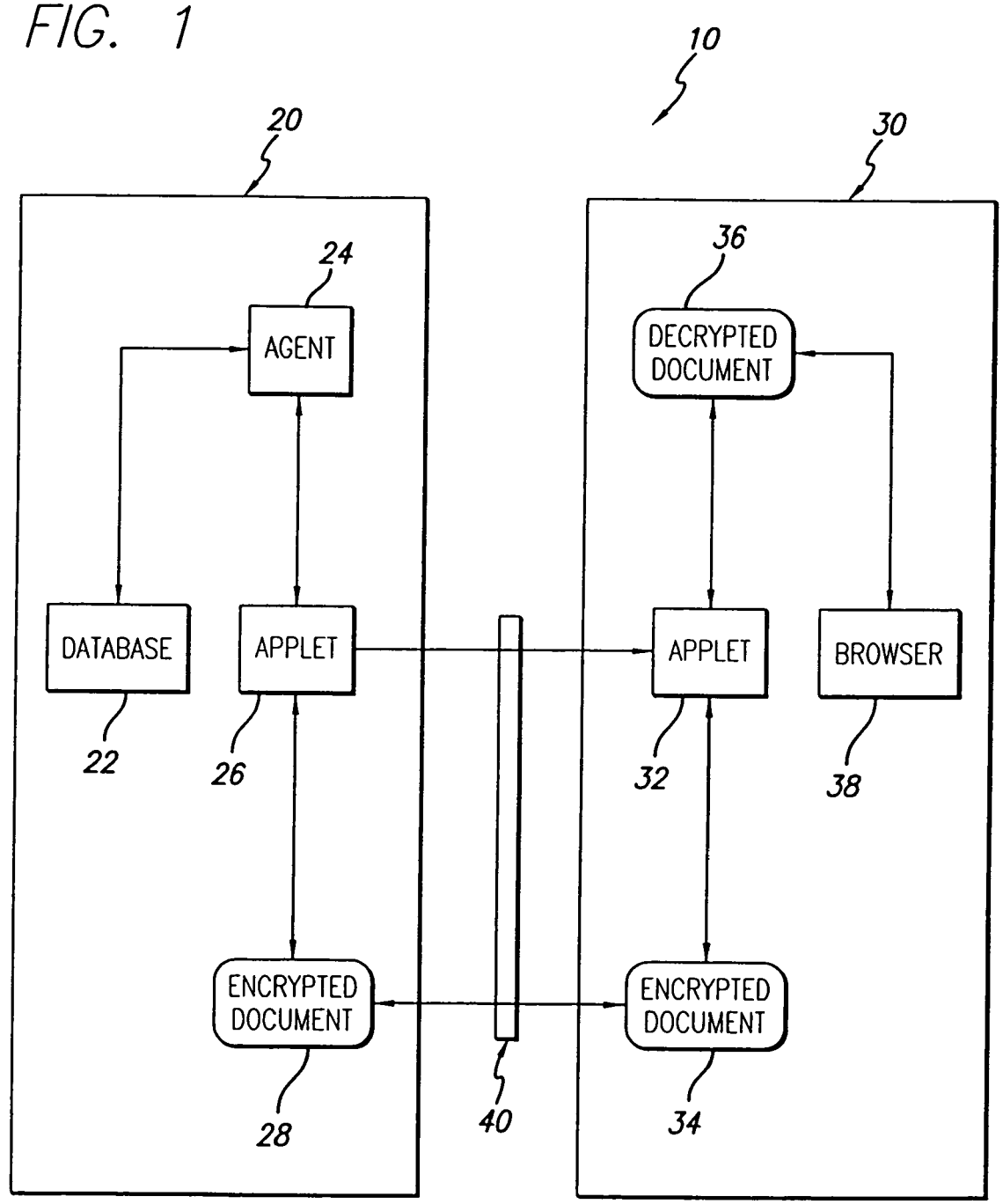
FIG. 1 is a block diagram showing an illustrative embodiment of the document management system of the present invention.

FIG. 1 is a block diagram showing an illustrative embodiment of the document management system of the present invention. The system 10 includes an information management system 20 with documents organized in folders stored in a database 22. In the best mode, the information management system 20 is implemented via a server on a network. The information management system 20 further includes agents 24, e.g., software programs associated with folders, that regulate the operation of the system 10 in accordance with the teachings of the present invention. For example, the agent 24 performs tasks on behalf of users when a predetermined event happens in the associated folder. As discussed more fully below, examples of events include "document added", "document deleted", "request for view", etc.

As shown in FIG. 1, the document management server 20 further includes an applet 26. As will be appreciated by those skilled in the art, applets are mini-software programs or routines. In accordance with the present teachings, the applet 26 performs several functions, one of which is to encrypt selected documents 28 retrieved from folders in the database 22. As discussed more fully below, a second applet 32 is transmitted from the document management server 20 to a client machine (e.g., personal computer, netpliance, etc.) over the network link 40. The applet at the client machine performs several functions including decryption of a document 34 received over the network 40 from the server 20 and providing the decrypted document 36 to a browser 38 on the client for viewing, editing etc. by a user. Those skilled in the art will appreciate that the browser 38 may be any document viewing program without departing from the scope of the present teachings.

The present invention is designed to operate with users having specified privileges to view, make comments, approve, disapprove or track changes to documents. The first step in secure document access is to submit the document in a secure manner to the information management system. To do this, the user browses to the appropriate folder on the information management system and selects the "submit" menu option. The user indicates the document to be submitted. For example, the user would indicate that he or she wanted to submit a secure purchase order request. The agent associated with the folder would download an applet to the client machine. This applet would encrypt the document and load it back up to the agent. It would be stored in the associated folder. In this example, it would be stored in the purchase order folder. The document has been submitted in a secure manner to the information management system and is stored in a secure manner in it.

As part of secure document submittal, the agent checks the authentication of the submitter to be certain that he or she is authorized to make document submittals. One way of checking authentication is to check the digital signature of the submitter. This is accessible through the web browser, among other ways.

Customized, secure access to shared documents can be achieved in the following manner. First, the user browses to the appropriate folder in the information management system and selects the view option. Next, the agent associated with the folder checks that the user is authenticated to view the document. If the user is not authenticated, it tags the attempt as a tag in the document and prevents the user from viewing it. If the user is authorized, the process continues. Then, the agent downloads the document (which is encrypted) to the user's machine and also downloads an applet to the user's machine. The applet then decrypts the document and generates a view that is specific to the user. This view would include the original document, any previous comments the user made, a means of submitting new comments and any other processing commands specific to the user. An example of this would be "Document Approval" by the user. The document management method of the present invention is discussed more fully below with reference to FIG. 2.

Figure 2E:
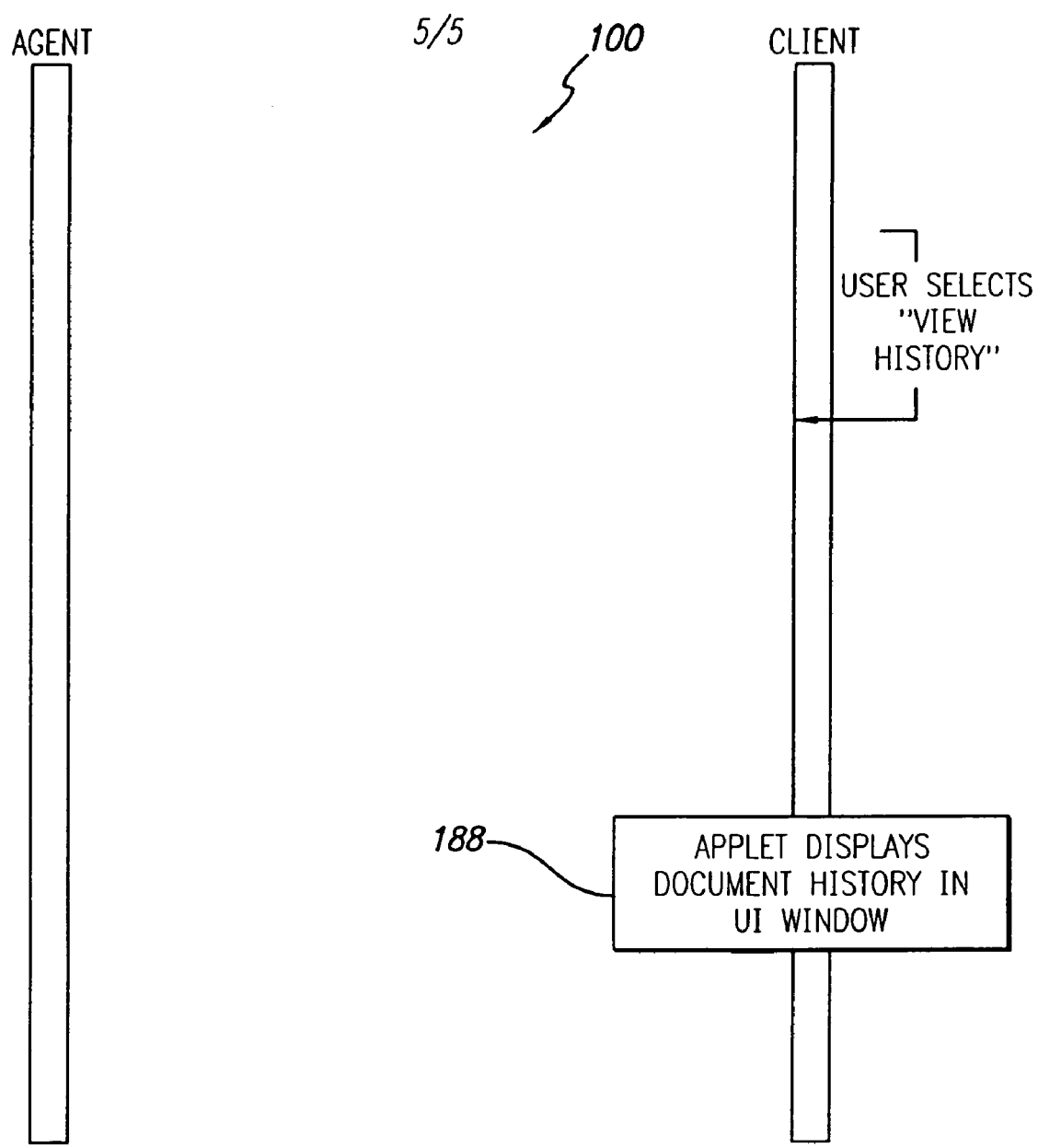
FIG. 2 is a flow diagram illustrative of the document management method of the present invention.

FIG. 2 is a flow diagram illustrative of the document management method of the present invention. As shown in FIG. 2(*a*), in accordance with the inventive method 100, after the user browses to a selected document folder, at step 102, the agent 24 procures the user's digital signature from the browser. As is well-known in the art, digital signatures are digital codes that are issued by an issuing authority (like VeriSign) and are specific to a user or entity. They may be used to sign documents, authenticate user's identities and may be used in encryption.

Next, at step 104, the agent 24 gets the user's access rights from the database 22. If, at step 106, the agent 24 determines that the user has access rights to the system 20, then, at step 108, the agent creates a random (e.g., 128 bit) session key. Next, (step 110) the agent 24 encrypts a file list appropriate for the user's access rights with a session key. At step 112, the agent 24 generates a message digest of the file list and, at step 114, encrypts the message digest with the agent's private key.

Private and public keys are well-known in the art. A private key is one portion of a digital signature issued by an issuing authority. It is kept secret and not shared. A public key is another portion of a digital signature issued by an issuing authority. It is shared with others. They are mirror images of each other and together they enable public and private key encryption.

At step 116, the agent gets the user's public key from the database and at step 118, encrypts the session key with the user's public key. Then the agent downloads the applet 32 to the client along with the encrypted session key, access rights/file list, and message digest.

At step 120, the client applet 32 decrypts the session key with the user's private key. Next, at step 122, the applet 32 decrypts the access rights/file list with the session key. At step 124, the applet 32 generates a message digest of the file list. One preferred method for generating a message digest is to use the SHA-1 (Secure Hash Algorithm) from NIST published in 1994 and part of the ANSI X9.30 standard. At step 126, the applet 32 decrypts the agents message digest of the file list. At step 128, the applet 32 compares the agent message digest with the applet message digest and, if they are equal, then, at step 130, the applet 32 generates a user interface based on the access rights of the user. (If they are not equal, access is denied.)

As shown in FIG. 2(*b*), when the user selects 'file' and 'view' the applet 32 sends the file ID and 'view' command to the agent 24. In response, at step 132, the agent 24 checks the database for verification of the user's access rights. At step 134, the agent procures the encrypted file from the database 22. Next, the agent decrypts the file with the agent's private key (step 136). At step 138, the agent 24 generates a random session key. At step 140, the agent 24 encrypts the file with the session key. At step 142, the agent 24 generates a message digest of the file. At step 144, the agent encrypts the message digest with the agents private key and at step 146, encrypts the session key with the user's public key. Next, the encrypted session key and encrypted file are downloaded to the client.

At step 148, the applet 32 decrypts the session key with the user's private key. At step 150, the applet 32 decrypts the file with the session key. At step 152, the applet 32 generates a message digest of the file. The applet 32 then decrypts the agents message digest with the agent's public key. At step 156, the applet 32 compares the agent's message digest with the applet's message digest. If they are equal, then at step 158, the applet 32 displays the file content in the user interface window. (If they are not equal, access is denied.)

As shown in FIG. 2(*c*), the user may modify the file. If, as shown in FIG. 2(*d*), the user desires to submit changes in the document, then, after selecting 'submit changes' at step 160, the applet 32 adds tags for user's changes. At step 162, the applet 32 generates a random 128 bit session key. At step 164, the applet 32 encrypts the file with the session key and, at step 166, generates a message digest of the file. Next, the applet 32 encrypts the message digest with the applet's private key and encrypts the session key with the user's private key (steps 168 and 170). The applet 32 then sends the encrypted file, session key and message digest to the agent 24 on the server 20.

Then, in accordance with the illustrative method, at step 172, the agent 24 decrypts the session key with the user's public key. At step 174, the agent 24 then decrypts the file with the session key and at step 176 generates a message digest of the file. At step 178, the agent decrypts the applet's message digest with the applet's public key 178. At step 180, the agent 24 compares the agent's message digest with the applet's message digest. If they are equal, then at step 182, the agent 24 adds tags for user, submission, time and date. (If they are not equal, the changes are rejected.) Next, at step 184, the agent 24 encrypts the file with the agent's public key. At step 186, the agent 24 then writes the encrypted file to the file system.

As shown in FIG. 2(*e*), if the user selects 'view history', then at step 188, the applet 32 displays the document history in the user interface (browser) window.

Those skilled in the art may write an agent 24 and applets 26 and 32 suitable for a given application without undue experimentation and without departing from the scope of the present teachings.

The problems addressed by the invention include:
1. Authentication of a user's identity, using digital signatures.
2. Verification, using digital signatures, of an individual's authority to submit documents, access documents, modify documents or view the history of these operations on a document.
3. Secure submission of documents, with encryption, to an information management system.
4. Secure viewing of documents from an information management system.
5. Customizing the view of a document to the individual and to the individual's access rights.
6. Secure modification of documents.
7. Tracking submission, accesses and modifications to a document.
8. Non-repudiation of document submission, access and modification.
9. Integrity of data, using encryption, between the client and the server.

The advantages of the invention over what has been done before include:
1. The processes involving documents are automated. This increases efficiency.
2. Individuals' access rights are checked before they can submit, view or modify documents. The software agent checks the user's digital signature before allowing the user to submit, view or modify a document. For example, only the doctor has the right to submit the prescription form and only the pharmacist has the right to view it. The state pharmacy board has the right to audit the process and see what happened.
3. The documents remain encrypted while they are stored in the information management system and while they are being submitted to or are being downloaded from the information management system. This guarantees that they can not be tampered with while they are stored in the information management system or that they cannot be viewed, even if they are intercepted while being downloaded from the information management system to the client machine.
4. Other systems do not provide a customized view of a document. Individuals view the whole document or nothing. This invention provides a view of a document customized to the individual. For example, a document could be added that describes a new printer and its associated software. One view of the document, appropriate for engineers, would show all the technical details of the printer and the software. A separate view, appropriate for technical writers, would show the user interface and user commands so they could write the printer's manuals.
5. Unlike the inventive system, other systems do not maintain an audit trail of submission, accesses and modifications to a document. The advantage of this is that an analysis may be performed on how efficient and effective work processes are. For example, an analysis may be done on who submits the most work orders and how quickly individual workers process them.

In short, although other document management systems are known to allow multiple users to view a shared document, none of these solutions appear to provide document encryption where the encryption is accomplished on the client machine and the document is transferred to the information management system in a secure, encrypted form. None of the other solutions appear to use digital signatures to verify that the person who wants access to the shared document is allowed that access, and none appear to provide a customized view of the document that is customized to the individual trying to access the document. Further, no other product, known to the present applicant, provides a complete audit trail of accesses, modifications, and process approvals or disapprovals.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A method for sharing documents including the steps of:
   receiving, from a user of a client, a request for a document from a server;
   obtaining access rights for the user;
   downloading to the client the access rights, the document, and an applet, the applet being operable to customize a display of the document by the client according to the access rights, and allowing modification of the document according to the access rights.

2. The invention of claim 1 further comprising verifying that the user has access rights for the document.

3. The invention of claim 2 wherein the step of verifying includes the step of authenticating a digital signature.

4. The invention of claim 2 wherein the step of verifying includes the step of authenticating a private key.

5. The invention of claim 2 wherein the step of verifying includes the step of authenticating a public key.

6. The invention of claim 1 further including the step of tracking changes in said document.

7. The invention of claim 1 further including the step of tracking access of said document.

8. The invention of claim 1 further including the step of tracking submission of documents.

9. The invention of claim 1 further including the step of the applet causing the client to display a view of the data for the user, the view being customized according to the access rights.

10. The method of claim 1 wherein downloading includes downloading the accesses rights and the document with a session key, wherein the access rights and the document have been encrypted with the session key and the session key has been encrypted with a public key for the user.

11. The method of claim 10 wherein the applet is operable to decrypt the session key with a private key for the user and to decrypt the data and the access rights with the decrypted session key.

12. The method of claim 10 further comprising randomly generating the session key.

13. A document management system comprising:
a server for providing data from a document stored in a folder, the server operable to receive, from a user of a client, a request for the data; and an agent associated with said folder, the agent operable to obtain access rights for the user and to cause the server to download to the client the access rights, the data, and an applet, the applet being operable to customize a display of the data by the client according to the access rights, wherein the agent is further operable to allow modifications of the data according to the access rights.

14. The invention of claim 13 wherein the agent is operable to encrypt the data and the access rights and the applet is operable to decrypt the data and the access rights.

15. The invention of claim 13 further including means for verifying a user's identity before the agent causes the server to download the data to the client.

16. The invention of claim 13, further comprising means for encrypting the data and the access rights with a session key and means for encrypting the session key with a public key for the user, and wherein the agent is operable to cause the server to download the encrypted session key to the client along with the applet, the encrypted access rights, and the encrypted data.

17. The invention of claim 16, wherein the applet is operable to decrypt the session key with a private key for the user and to decrypt the data and the access rights with the decrypted session key.

18. The invention of claim 16 further including means for randomly generating said session key.

19. The invention of claim 13 wherein said access rights are stored in a database.

* * * * *